United States Patent
Mihlbauer et al.

(10) Patent No.: US 12,114,646 B2
(45) Date of Patent: Oct. 15, 2024

(54) AMPHIBIAN/REPTILE HABITAT WITH REMOVABLE INSERT

(71) Applicant: CENTRAL GARDEN & PET COMPANY, Walnut Creek, CA (US)

(72) Inventors: Brad L. Mihlbauer, Mukwonago, WI (US); Phillip C. Bartoszek, New Berlin, WI (US); Ernie Katris, Hawthorn Woods, IL (US); Lawrence E. Sternal, Kansasville, WI (US)

(73) Assignee: CENTRAL GARDEN & PET COMPANY, Walnut Creek, AZ (US)

( * ) Notice: Subject to any disclaimer, the term of this patent is extended or adjusted under 35 U.S.C. 154(b) by 0 days.

(21) Appl. No.: 17/173,276

(22) Filed: Feb. 11, 2021

(65) Prior Publication Data

US 2022/0248645 A1 Aug. 11, 2022

(51) Int. Cl.
*A01K 63/00* (2017.01)
(52) U.S. Cl.
CPC .................. *A01K 63/006* (2013.01)
(58) Field of Classification Search
CPC .... A01K 63/006; A01K 63/003; A01K 63/00; A01K 63/045; A01K 63/047
See application file for complete search history.

(56) References Cited

U.S. PATENT DOCUMENTS

| | | | |
|---|---|---|---|
| 3,141,442 A | | 7/1964 | Harris |
| 3,699,921 A | | 10/1972 | Janicek |
| 3,747,566 A | * | 7/1973 | Lovitz .................. A01K 63/003 119/251 |
| 3,786,781 A | * | 1/1974 | Poulsen ............... A01K 63/006 119/246 |
| 3,804,064 A | | 4/1974 | Kuneman et al. |
| 4,122,800 A | | 10/1978 | Mangarell |
| 4,788,938 A | * | 12/1988 | Davenport ........... A01K 63/006 428/15 |

(Continued)

FOREIGN PATENT DOCUMENTS

CN 208338687 U * 1/2019

OTHER PUBLICATIONS

Turtle Aquarium Tank, Geegoods, Amazon.com, earliest availability date Aug. 26, 2020 (Year: 2020).*

(Continued)

*Primary Examiner* — Tien Q Dinh
*Assistant Examiner* — Katelyn T Truong
(74) *Attorney, Agent, or Firm* — Grossman, Tucker, Perreault & Pfleger, PLLC

(57) ABSTRACT

In general, an enclosure is disclosed that includes a basin for storing water and an insert configured to be removably disposed within the basin and provide dry and wet sections that define a habitat for one or more amphibians and/or reptiles. Preferably, the insert includes an integrated filter arrangement that can be removed together, e.g., as a single unit, from the basin when cleaning is desired. More preferably, the insert includes a plurality of openings to allow water to drain via gravity into the basin as a user "pulls" the insert from the same. Accordingly, a user may then remove the insert from the basin without necessarily removing creatures from within the insert, and more importantly, from the habitat provided by the same.

16 Claims, 13 Drawing Sheets

(56) References Cited

U.S. PATENT DOCUMENTS

| | | | |
|---|---|---|---|
| 5,693,220 A * | 12/1997 | Sceusa | A01K 63/042 |
| | | | 119/268 |
| 6,029,605 A | 2/2000 | Licata | |
| 6,029,606 A | 2/2000 | Youngstrom et al. | |
| 6,073,583 A * | 6/2000 | Cumming | A01K 7/00 |
| | | | 119/72 |
| 6,397,780 B1 | 6/2002 | Youngstrom | |
| 6,532,899 B1 | 3/2003 | Hootman | |
| 6,651,586 B2 | 11/2003 | Horth et al. | |
| 10,172,329 B2 | 1/2019 | Szot | |
| 2002/0148409 A1 * | 10/2002 | Horth | A01K 63/006 |
| | | | 119/246 |
| 2009/0056638 A1 * | 3/2009 | Ting | A01K 63/045 |
| | | | 119/248 |
| 2012/0145613 A1 * | 6/2012 | Chen | A01K 63/045 |
| | | | 210/167.23 |

OTHER PUBLICATIONS https://www.amazon.com/BINANO-Filtration-Operation-Waterfall-Amphibian/dp/B094VBKSD1, 10 pgs.

https://theturtlehub.com/how-to-care-for-turtle-eggs, "Hatching Plan: A Complete Guide to Caring for Turtle Eggs—The Turtle Hub", 29 pgs.

\* cited by examiner

AMPHIBIAN/REPTILE HABITAT WITH REMOVABLE INSERT

FIELD

This specification relates generally to enclosures that provide habitats for pet amphibians/reptiles, and more particularly, to an enclosure for providing an amphibian/reptile habitat with a removable insert to simplify cleaning processes.

BACKGROUND

Amphibians and reptiles such as turtles, snakes and frogs, are popular pets given that they can be kept in compact habitats that provide both wet and dry regions. However, such habitats such as fish tanks and terrariums require regular maintenance and care. For example, maintaining a healthy habitat for turtles, e.g., within an aquarium or fish tank, generally includes testing swimming water at a regular interval, e.g., every 2-3 days, to ensure that the pH level remains between 7-8 on a scale of 1-14, for instance. At least some of the swimming water should be replaced weekly as ammonia or nitrite levels can quickly rise and can become unsafe/dangerous even when the water appears to be clean. Every two to three weeks the entire habitat/enclosure should be emptied of water and cleaned thoroughly, and the filter medium should be refreshed/replaced.

Monitoring and regular cleaning of habitats is important to the long-term health of the creature(s) living therein. However, performing the recommended full cleaning of habitats can be stressful on the creatures as they must be removed from the habitat and placed in temporary space, such as a bucket. Likewise, cleaning processes can be also stressful on humans as removing all of the water from the habitat can necessitate heavy lifting to "tip" or otherwise drain an enclosure which can risk both injury to the human and damage to an enclosure.

There exists a need for an enclosure to provide a habitat for amphibians/reptiles that simplifies cleaning processes and that minimizes or otherwise reduces the amount of stress/disruption of the creatures.

BRIEF DESCRIPTION OF THE DRAWINGS

The drawings included herewith are for illustrating various examples of articles, methods, and apparatuses of the teaching of the present specification and are not intended to limit the scope of what is taught in any way.

DETAILED DESCRIPTION

In general, an enclosure is disclosed herein that includes a basin for storing water and an insert configured to be removably disposed within the basin and provide dry and wet sections that define a habitat for one or more amphibians and/or reptiles. Preferably, the insert includes an integrated filter arrangement that can be removed together, e.g., as a single unit, from the basin when cleaning is desired. The insert further preferably includes a plurality of openings to allow water to drain via gravity into the basin as a user "pulls" the insert from within the same. Accordingly, a user may then remove the insert from the basin without necessarily removing creatures from within the insert, and instead, keep the creatures confined within the removed insert while cleaning the basin.

In one preferred example, an enclosure consistent with the present disclosure includes a basin defining a cavity to store water, and an insert configured to be disposed within the cavity of the basin. The insert preferably includes a profile that corresponds to a profile of the basin such that the insert can operate as a basin liner. Thus, the habitat of the enclosure may then preferably be entirely defined by the insert, or alternatively the insert and an associated insert cover, such that removal of the insert, or insert and associated cover, from the basin also removes the habitat from the basin. The insert preferably provides a dry section configured to be disposed above the stored water when the insert is disposed within the cavity of the basin, and a wet section disposed within the stored water of the basin when the insert is disposed within the cavity of the basin.

The insert also further preferably provides a transitional section, e.g., a sloped sidewall, to allow for the one or more creatures within the enclosure to travel between the dry and wet sections. The transitional section provided by the insert also preferably defines one or more first openings (also referred to herein as filter outlets) to communicate water from a filter section/cavity defined by the insert into the wet section, and/or one or more second openings (also referred to herein as filter inlets) to communicate water from the wet section into a filter inlet passageway within the cavity of the basin.

Figure 1:
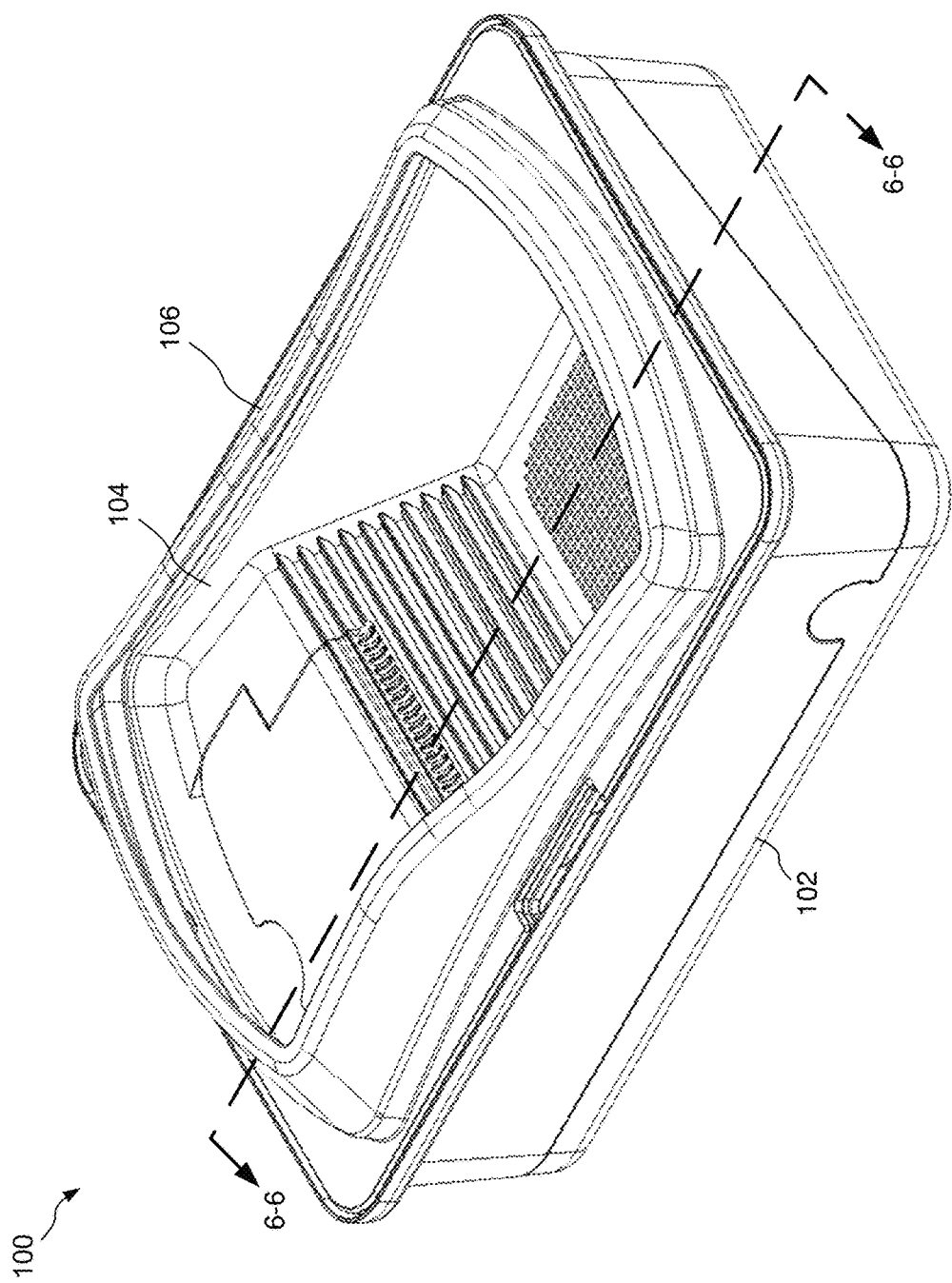
FIG. 1 shows an example enclosure consistent with aspects of the present disclosure.
Figure 2:
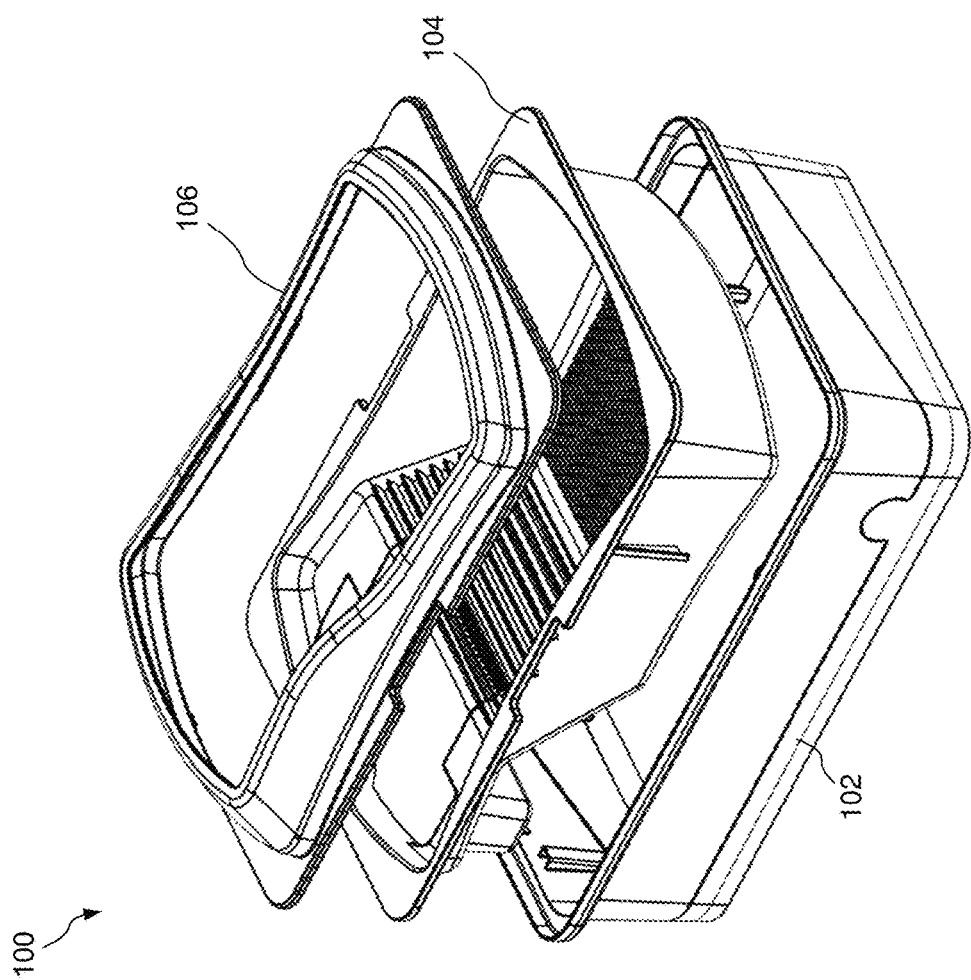
FIG. 2 shows the enclosure of FIG. 1 partially exploded in accordance with aspects of the present disclosure.

Turning to the Figures, FIGS. 1-2 show an example enclosure 100 for providing a habitat suitable for creatures such as amphibians and/or reptiles. The term creature as used herein refers to amphibians and/or reptiles unless otherwise provided.

As shown, the enclosure 100 preferably includes a basin 102, an insert 104, and an optional cover 106. The optional cover 106 may also be referred to herein as an insert cover. Preferably, the enclosure 100 is configured to preferably provide a habitat suitable for permanently housing one or more creatures, and more preferably one or more turtles. However, the enclosure 100 is equally suitable for relatively short-term usage as a habitat for one or more creatures such as during the cleaning of a primary habitat/tank. The insert 104 is also preferably configured to provide one or more water filters and be removable from the basin 102 to simplify cleaning, as is discussed in further detail below. More preferably, the insert 104 and associated filter(s) are configured to removable from the basin as a single unit such that the filter(s) remain coupled to the insert 104 when the same gets removed from the basin 102.

Figure 3A:
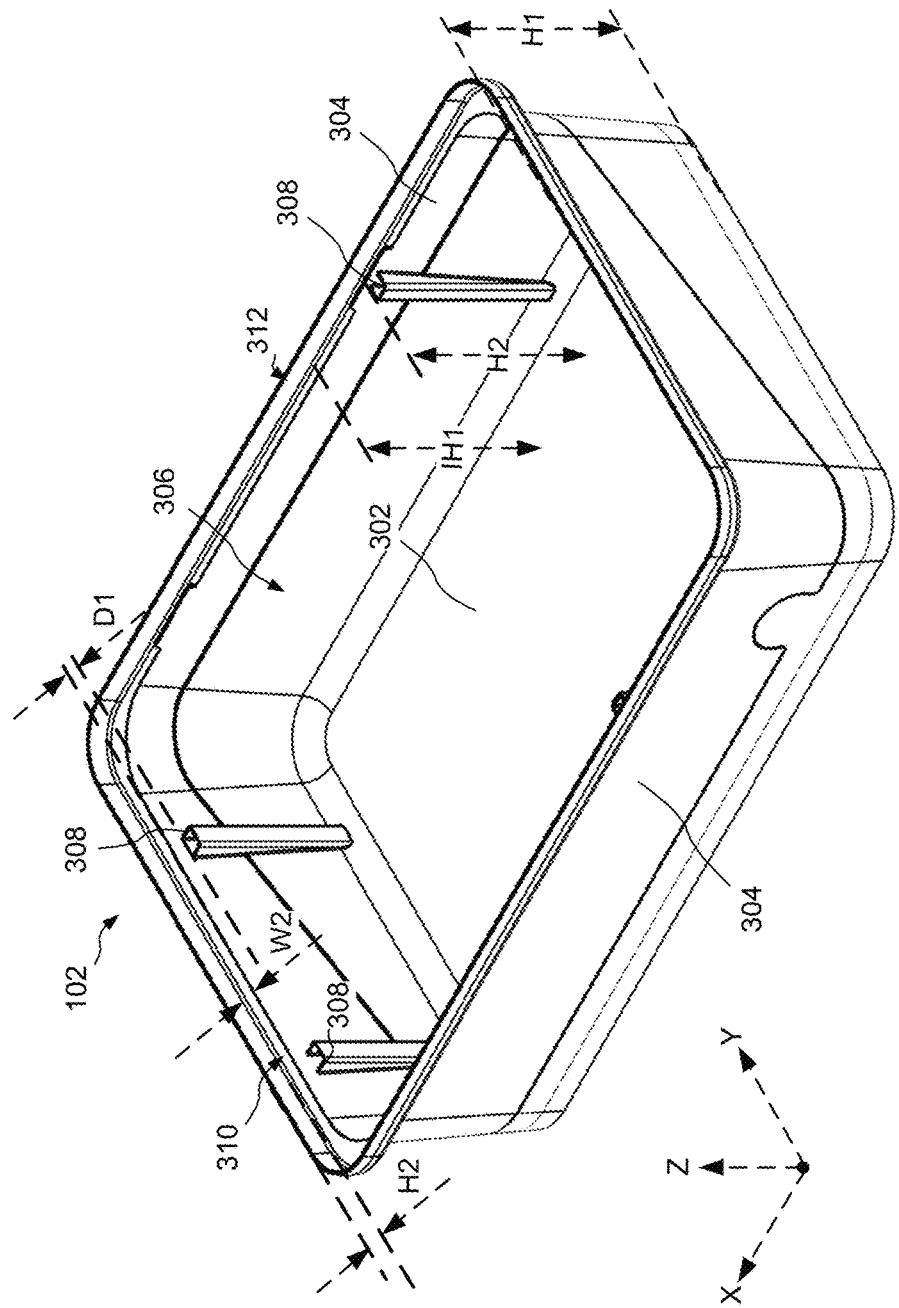
FIG. 3A shows the basin of the enclosure of FIG. 1 in isolation, in accordance with aspects of the present disclosure.
Figure 3B:
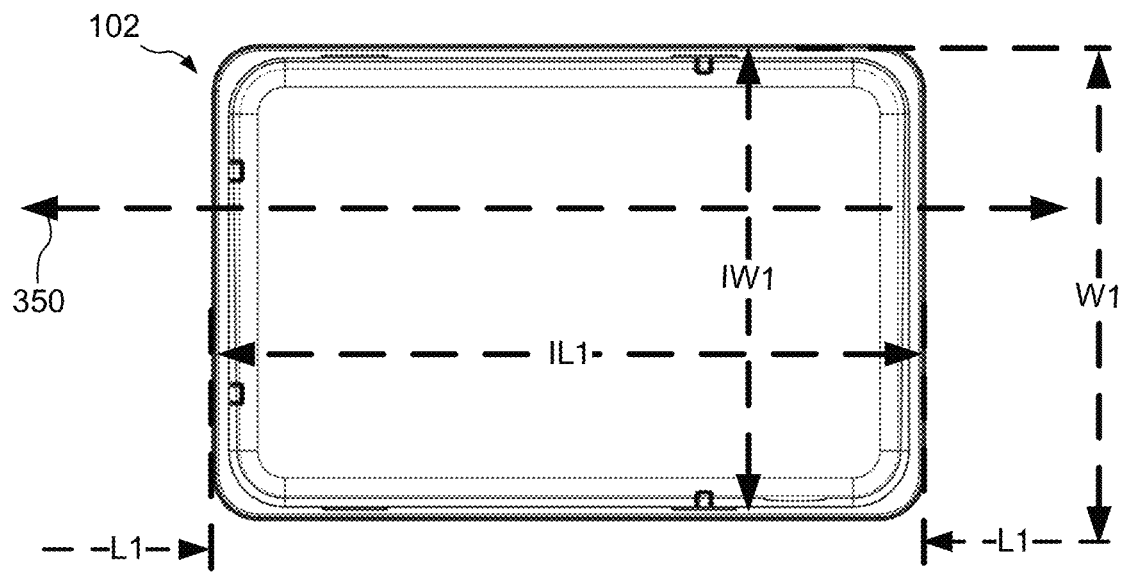
FIG. 3B shows a top view of the basin of FIG. 3A in accordance with aspects of the present disclosure.
Figure 3C:
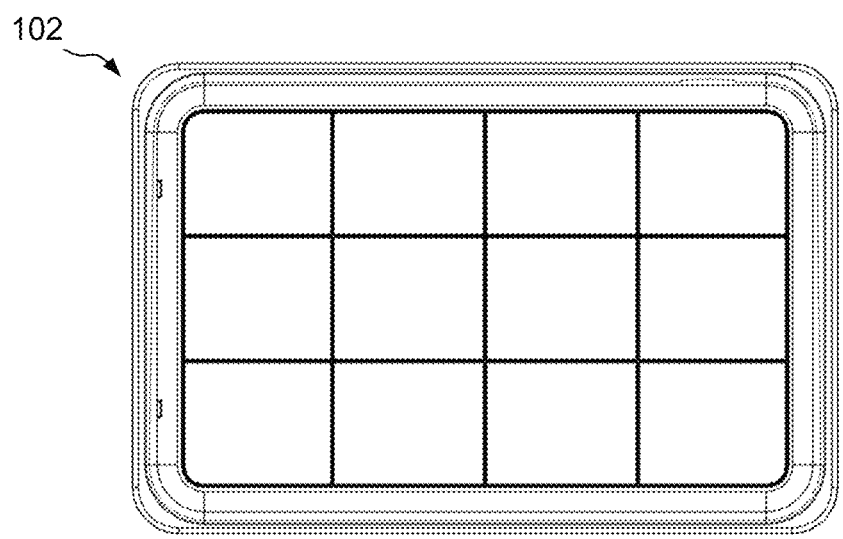
FIG. 3C shows a bottom view of the basin of FIG. 3A in accordance with aspects of the present disclosure.

FIGS. 3A-3C show an example of the basin 102 of FIGS. 1 and 2 in isolation. The basin 102 preferably includes a rectangular profile as shown in FIG. 3A, although other shapes and profiles are within the scope of this disclosure. The basin 102 preferably includes a base 302 that is configured to be supported by a floor or other surface that underlies the enclosure 100 and a plurality of sidewalls 304 that extend vertically from the base 302. The base 302 and the plurality of sidewalls 304 preferably define a cavity 306 suitable for holding/storing a maximum predefined volume of water, as is discussed in greater detail below.

The basin 102 is preferably formed of polymeric material such as thermoplastic material such as Polypropylene (PP). The basin 102 may be formed through injection molding or through other approaches such as additive manufacturing processes. More preferably, the base 302 and the plurality of sidewalls 304 are formed from a single, monolithic piece of material. The insert is also preferably formed of polymeric material, such as thermoplastic material, such as Polypropylene (PP).

As shown, the basin 102 includes an overall height H1, an overall width W1, and an overall length L1 (See FIG. 3B). The overall height H1 is preferably in the range of 5.5 to 6.5 inches, and more preferably at least 6 inches. The overall length L1 is preferably in the range of 23 to 25 inches, and more preferably at least 24 inches. The overall width W1 is preferably in the range of 15.5 to 16.5 inches, and more preferably at least 16 inches. In some preferred examples, the ratio of the overall length L1 relative to the overall width W1 of the basin 102 is 5:1, 4:1, 3:1, or 2:1.

As discussed above, the basin 102 is configured to store a predetermined volume of water. The predetermined volume of water is based at least in part on the overall length L1, the overall height H1, and the overall width W1 of the basin 102. In one preferred example, the maximum predetermined volume of water to be stored within the cavity 306 of the basin 102 is at least 5 gallons of water.

The plurality of sidewalls 304 of the basin 102 preferably define a step/shoulder feature based on surface 310 (See FIG. 3A). The surface 310 preferably extends substantially parallel with surfaces defining the base 302. The surface 310 includes an overall width W2 that can vary along the inner perimeter of the cavity 306 or may be uniform depending on a desired configuration. In one example, the surface 310 preferably includes an overall width W2 of at least 0.50 inches, or within the range of 0.375 to 0.625 inches.

Preferably, a lip 312 extends vertically from the surface 310 to an overall height H2, with the overall height H2 measuring at least 5.25 inches, or in the range of 5 and 5.50 inches. The lip 312 and the surface 310 defining the step feature can collectively provide a socket/receptacle for receiving an insert consistent with the present disclosure, e.g., insert 104. The surface 310 can underlie and/or support a corresponding rim 403 of the insert 104 (see FIG. 4A) and provide a mechanical stop to limit insertion of the insert 104 into the basin 102, e.g., along the Z axis, beyond a predetermined distance. For example, the predetermined distance may be in the range of 3 to 4 inches, and after the insert 104 is inserted into cavity 306 of the basin 102 to the predetermined distance along the Z axis, rim 403 of the insert 104 may then engage the surface 310 of the basin 102. The lip 312 can also minimize or otherwise reduce lateral shift of the insert 104 within the cavity 306 of the basin 102, e.g., along the X and Y axis, by abutting the insert 104.

The plurality of sidewalls 304 of the basin 102 preferably define a plurality of projections 308 (FIG. 3A). Each projection of the plurality of projections 308 preferably extend from the base 302 to an overall height H2. In one preferred example, the overall height H2 of each projection of the plurality of projections 308 is in the range of 4.8 to 5.8 inches. More preferably, the overall height H2 of each projection of the plurality of projections 308 is less than the overall height H1 of basin 102 to provide an offset distance D1. The offset distance D1 preferably measures in the range of 0.045 to 0.125 inches, for example. In one preferred example, the insert 104 can include feet/projections 422 to engage with the plurality of projections 308 of the basin 102 to hold/maintain the insert 104 above the cavity 306 and allow water to drain from the insert 104 into the cavity 306 via gravity, as is discussed in greater detail below. In this example, the offset distance D1 advantageously provides a recessed socket/receptacle within the cavity 306 that allows for the base 402 (See FIG. 4A) of the insert 104 to be held/suspended above the cavity 306 of the basin 102 but below an upper edge defining the lip 312 to ensure that water drains into the cavity 306, e.g., to begin cleaning of the enclosure 100, rather than spilling on to surfaces surrounding the enclosure 100.

Figure 4A:
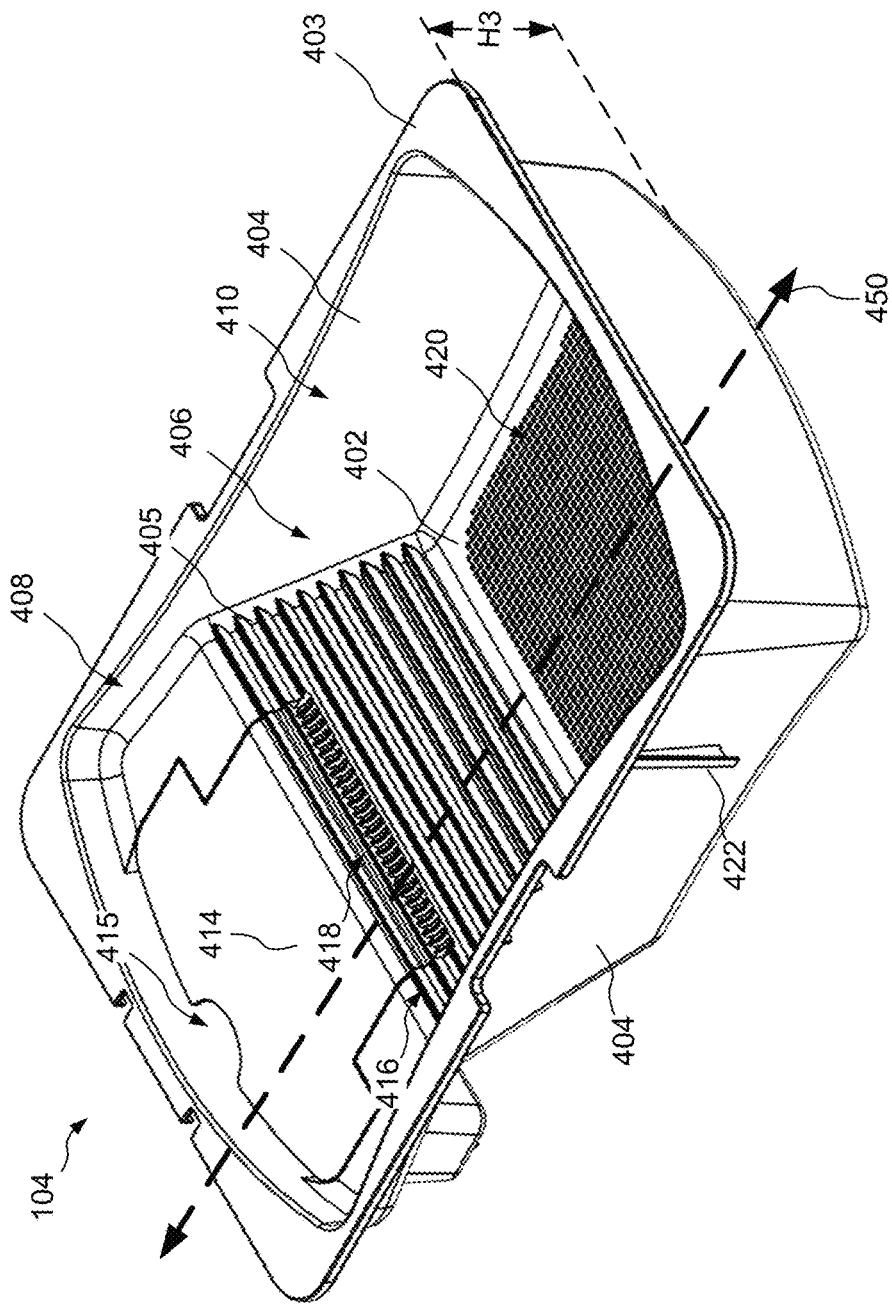
FIG. 4A shows the insert of the enclosure of FIG. 1 in isolation, in accordance with aspects of the present disclosure.

Referring to FIGS. 4A-4H, an example of the insert 104 of the enclosure 100 is shown in isolation in accordance with aspects of the present disclosure. The insert 104 preferably includes a rectangular profile as shown in FIG. 4A, although other shapes and profiles are within the scope of this disclosure. More preferably, the insert 104 includes a profile that substantially corresponds with the profile of the basin 102 to allow for "nesting" as discussed further below.

The insert 104 preferably includes a base 402 and a plurality of sidewalls 404 that extend vertically from the base 402. The base 402 and the plurality of sidewalls 404 preferably define a cavity 406 suitable for holding/storing a maximum predefined volume of water to provide a wet section, as is discussed in greater detail below.

The insert 104 preferably includes an overall height H3 in the range of 5.3 to 5.8 inches, and more preferably at least 5.3 inches. The overall length L2 of the insert 104 preferably measures between 23.1 and 24.2 inches, and more preferably at least 23.6 inches (See FIG. 4C). The overall width W3 of the insert 104 preferably measures in the range of 15.1 to 16.2 inches, and more preferably at least 15.6 inches.

In some preferred examples, the ratio of the overall length L2 relative to the overall width W3 of the insert 104 is 5:1, 4:1, 3:1, or 2:1.

In one preferred example, the overall (outer) dimensions of the insert 104 correspond to the inner dimensions of the cavity 306 of the basin 102 to allow the insert 104 to "nest" therein. One example of this nested configuration is shown in FIG. 1. The basin 102 defining a socket/receptacle based on the cavity 306 preferably includes an overall inner length IL1 (See FIG. 3B), an overall inner width IW1 (See FIG. 3B), and an overall inner height/depth IH1 (See FIG. 3A) that provides an interference fit with corresponding overall length L2, overall width W3, and overall height H3 of the insert 104.

In one preferred example, the basin 102 and insert 104 are configured to "nest" in a single orientation. For example, the cavity 306 of the basin 102 can be configured to only allow for insertion of the insert 104 into the same when the longitudinal axis 350 of the basin 102 (See FIG. 3B) and the longitudinal axis 450 of the insert 104 (See FIG. 4A) extend substantially in parallel with each other.

Preferably, the plurality of sidewalls 404 of the insert 104 define a rim 403. The rim 403 may also be referred to herein as a flange. The rim 403 preferably extends transverse relative to the plurality of sidewalls 404 and defines at least a portion of an opening/aperture that transitions to the cavity 406 of the insert 104, such as shown in FIG. 4A.

Preferably, the overall height H3 of the insert 104 is configured to ensure that the insert 104 can be inserted into the cavity 306 of the basin 102 to a distance that allows the rim 403 of the insert 104 to bottom out against the surface 310 of the basin 102 (See FIG. 3A) or otherwise be within close proximity of the surface 310, as discussed above.

Continuing, the cavity 406 of the insert 104 further preferably defines a dry section/region shown generally at 408 and a wet section/region shown generally at 410. Preferably, the insert 104 defines substantially all of the wet and dry sections of the enclosure 100 which are traversable by creatures stored therein, e.g., at least 90% of the wet and dry sections. More preferably, the insert 104 defines all of the wet and dry sections of the enclosure 100 that can be traversed by creatures stored therein.

Figure 4B:
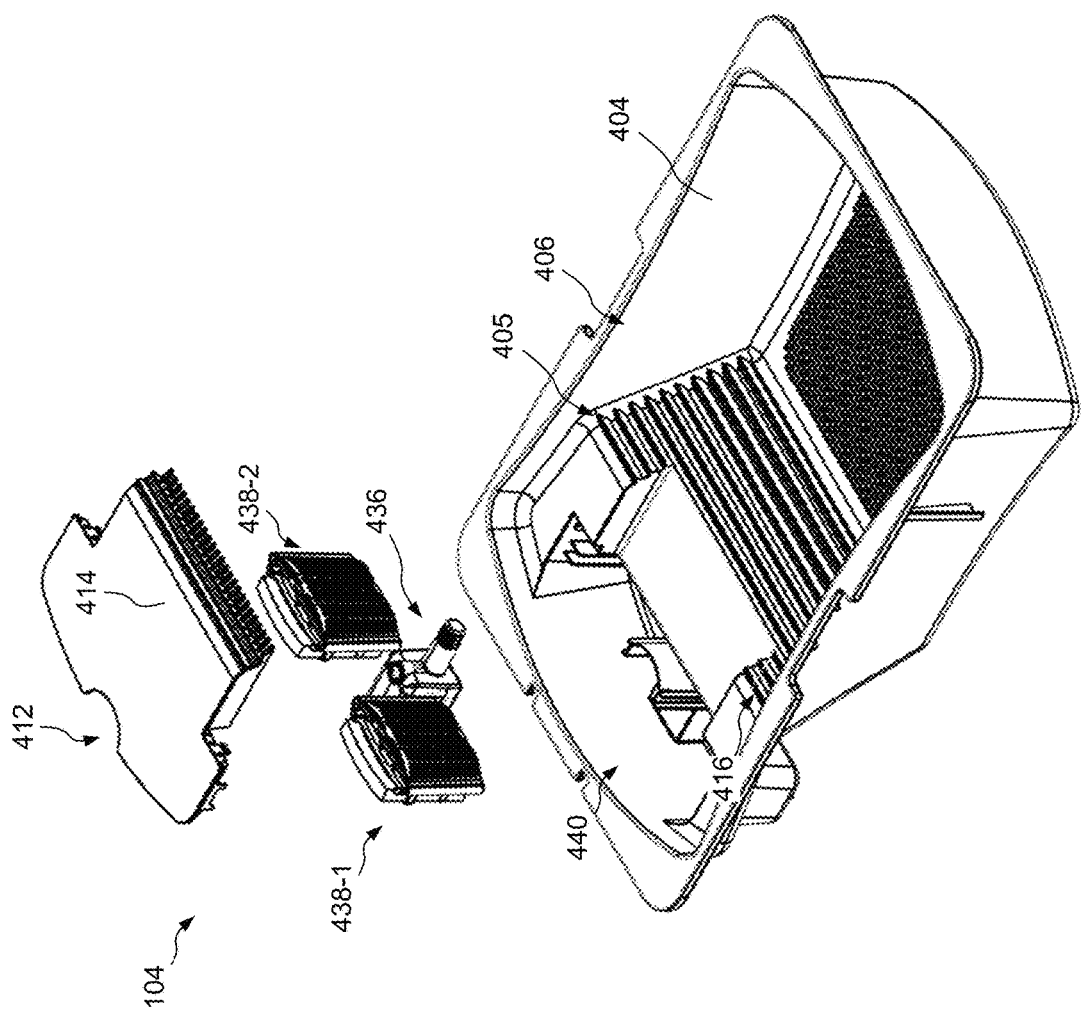
FIG. 4B shows the insert of FIG. 4A partially exploded, in accordance with aspects of the present disclosure.
Figure 4C:
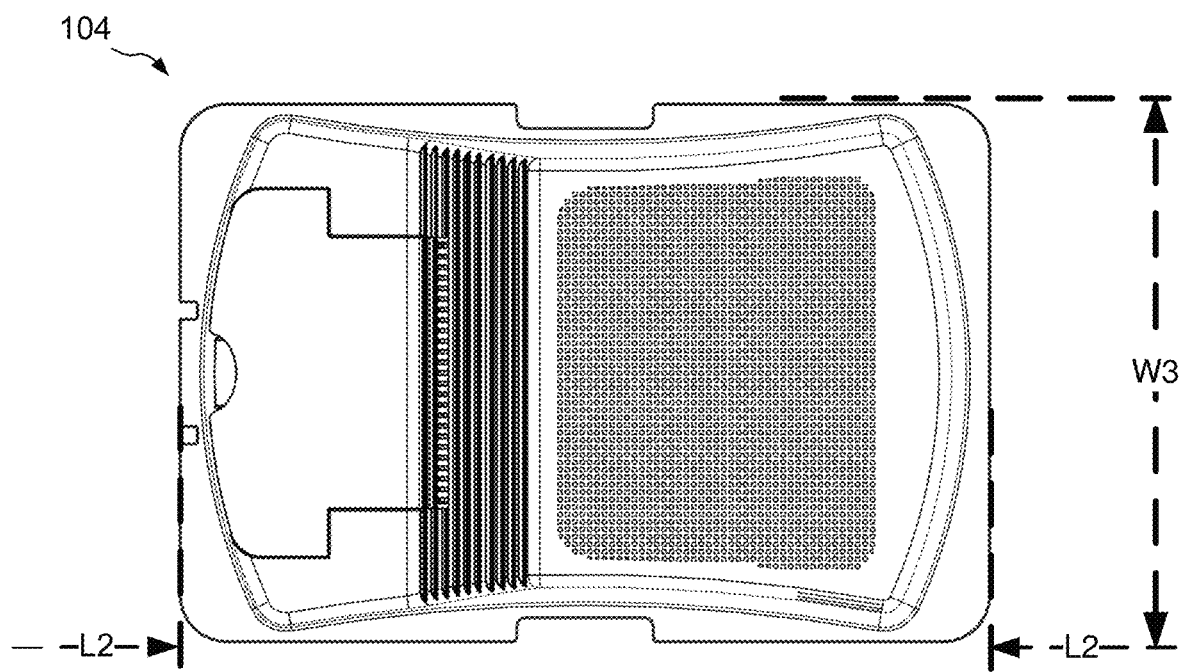
FIG. 4C shows a top view of the insert of FIG. 4A in accordance with aspects of the present disclosure.
Figure 4D:
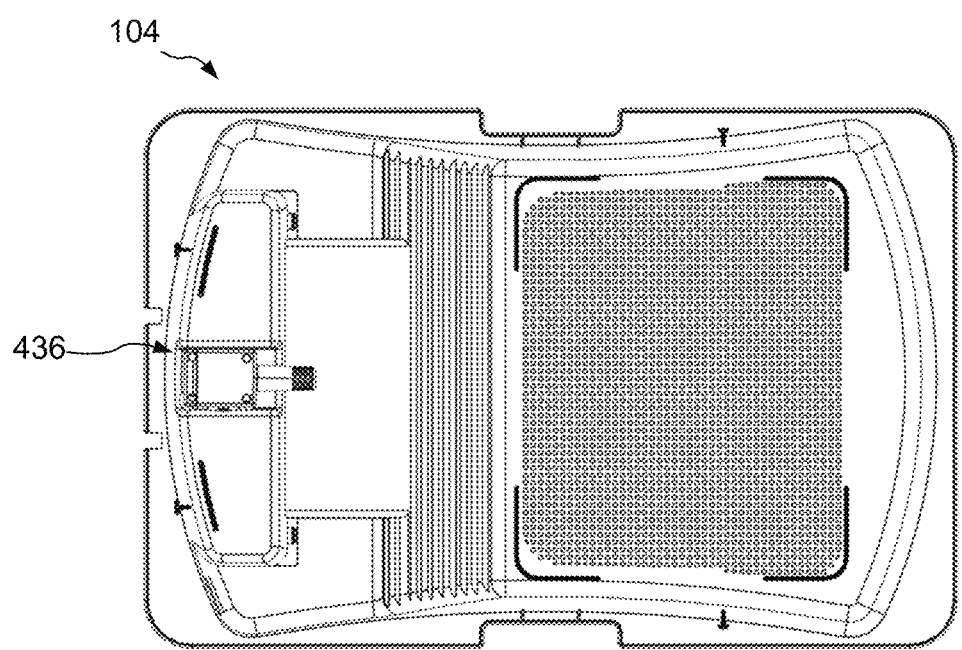
FIG. 4D shows a bottom view of the insert of FIG. 4A in accordance with aspects of the present disclosure.
Figure 4E:
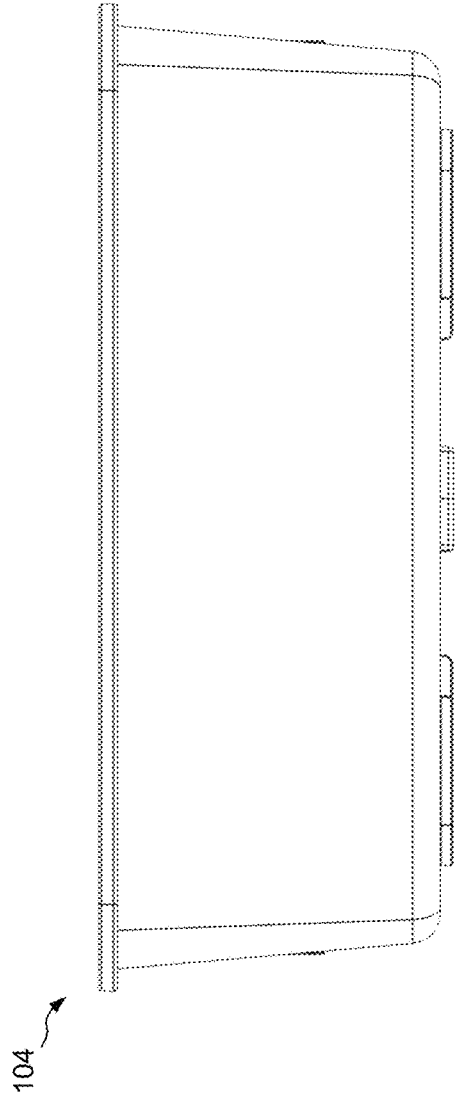
FIG. 4E shows a back view of the insert of FIG. 4A in accordance with aspects of the present disclosure.

The dry section 408 preferably includes a platform defined at least in part by a top surface 414 provided by a filter cover 412 (See FIG. 4B). The top surface 414 is preferably substantially flat, although this disclosure is not limited in this regard. The top surface 414 preferably extends substantially parallel with the surface defining the base 402 and/or substantially parallel with the longitudinal axis 450 of the insert 104.

As further shown, the top surface 414 preferably defines an opening 415. A vacuum tool may be inserted into the opening 415 to suction water from the enclosure 100, and more particularly from a filter cavity 440 defined by the insert 104 as discussed further below, for cleaning purposes without necessarily removing the insert 104 from the basin 102. The opening 415 may also be configured to allow a user to insert one or more fingers and supply a pulling force to remove/decouple the filter cover 412 from the insert 104.

Preferably, the dry section 408 is configured to cause the top surface 414 to be disposed above the water stored within the cavity 306 of the basin 102 (See FIG. 3A) when the insert 104 is disposed therein. On the other hand, at least the base 402 of the insert 104 is configured to be disposed within the water stored within the cavity 306 of the basin 102 when the insert 104 is disposed therein.

As shown, the plurality of sidewalls 404 preferably include a sloped sidewall 405. The sloped sidewall 405 preferably extends at a predetermined angle θ1 from the base 402 (See FIG. 4G). In one preferred example, the predetermined angle θ1 measures in the range of 35 to 65 degrees, and preferably a relatively acute angle of 50+−15 degrees (See FIG. 4G). Thus, the sloped sidewall 405 preferably defines at least a portion of a transitional section of the enclosure 100 that adjoins the wet and dry sections and allows for creatures such as turtles to transition to and from the dry and wet sections 408, 410, respectively.

Preferably, the sloped sidewall 405 includes a plurality of grooves 416 that face the cavity 406 of the insert 104. Preferably, each groove of the plurality of grooves 416 extend substantially transverse relative to the longitudinal axis 450 of the insert 104, although this disclosure is not limited in this regard. The plurality of grooves 416 may be configured as V-shaped grooves, such as shown, or can include other profiles depending on a desired configuration. The plurality of grooves 416 may therefore provide a plurality of step features to allow for creatures to more easily traverse the sloped sidewall 405 when transitioning/traveling from the dry section 408 to the wet section 410, and vice-versa.

The filter cover 412 preferably defines at least a portion of the sloped sidewall 405, which is shown more clearly in FIG. 4B. In this preferred example, the filter cover 412 can therefore provide a portion of the plurality of grooves 416. Alternatively, or in addition, the filter cover 412 defines one or more first openings 418 (See FIG. 4A). The one or more first openings 418 can provide an outlet for a filter arrangement within the filter cavity 440 (See FIG. 4B) to communicate filtered water to the wet section 410 of the insert 104 as is discussed in greater detail below. Accordingly, the one or more first openings 418 may also be referred to herein as filter outlet openings, filter outlets, or simply outlets. Preferably, the one or more first openings 418 are configured with dimensions that prevent creatures from becoming trapped/stuck therein.

The one or more first openings 418 defined by the sloped sidewall 405 are preferably disposed adjacent the dry section 408, such as shown in FIG. 4A. Having the one or more first openings 418 disposed adjacent the dry section 408 advantageously provides filtered water at a location which is adjacent the top of the cavity 406 to allow the clean water to displace the unfiltered/unclear water towards the one or more second openings 420 that provide filter inlets, which are discussed in detail further below. Another advantage of the one or more openings 418 along the sloped sidewall 405 as shown in FIG. 4A include water surface agitation as water is output by the same which results in oxygenation of the water.

The base 402 further preferably defines the one or more second openings 420. In one preferred example, the one or more second openings 420 are configured as a plurality of openings that extend across at least 50 percent of the overall surface area of the base 402 of the insert 104, and more preferably, at least 80 percent of the overall surface area of the base 402 of the insert 104.

In any such cases, the one or more second openings 420 of the base 402 are preferably configured to communicate water from the wet section 410 of the insert 104, and more specifically the cavity 406 of the insert 104, to within a lower portion of the cavity 306 of the basin 102 that defines a filter input passageway (which may also be referred to herein as a filter inlet passageway), as is discussed in further detail below. The one or more second openings 420 may therefore also be referred to herein as filter inlet openings, filter inlets, or simply inlets. Preferably, the one or more second openings 420 are also configured with dimensions that prevent creatures from becoming trapped/stuck therein.

Turning specifically to the partially-exploded view of the insert 104 in FIG. 4B, the plurality of sidewalls 404 further preferably define a filter cavity 440, which may also be referred to herein as a filter section. The filter cavity 440 includes an overall volume that is preferably less than or equal to the overall volume of the cavity 406.

The filter cavity 440 further is also preferably configured to receive a filter arrangement. The filter arrangement disposed within the filter cavity 440 preferably comprises a pump 436 and first and second filter devices 438-1, 438-2, which may also be referred to herein as filter cartridges or filter assemblies. The particular number of filters shown in FIG. 4B is not intended to be limiting and an enclosure consistent with the present disclosure can include more or fewer filter devices/cartridges. The first and second filter devices 438-1, 438-2 can each comprise a filter housing and filter media such as Filter floss, Filter sponge, Carbon media, and/or Biological media. The pump 436 can comprise a submersible pump capable of generating at least 65 GPH flow rate.

Figure 5:
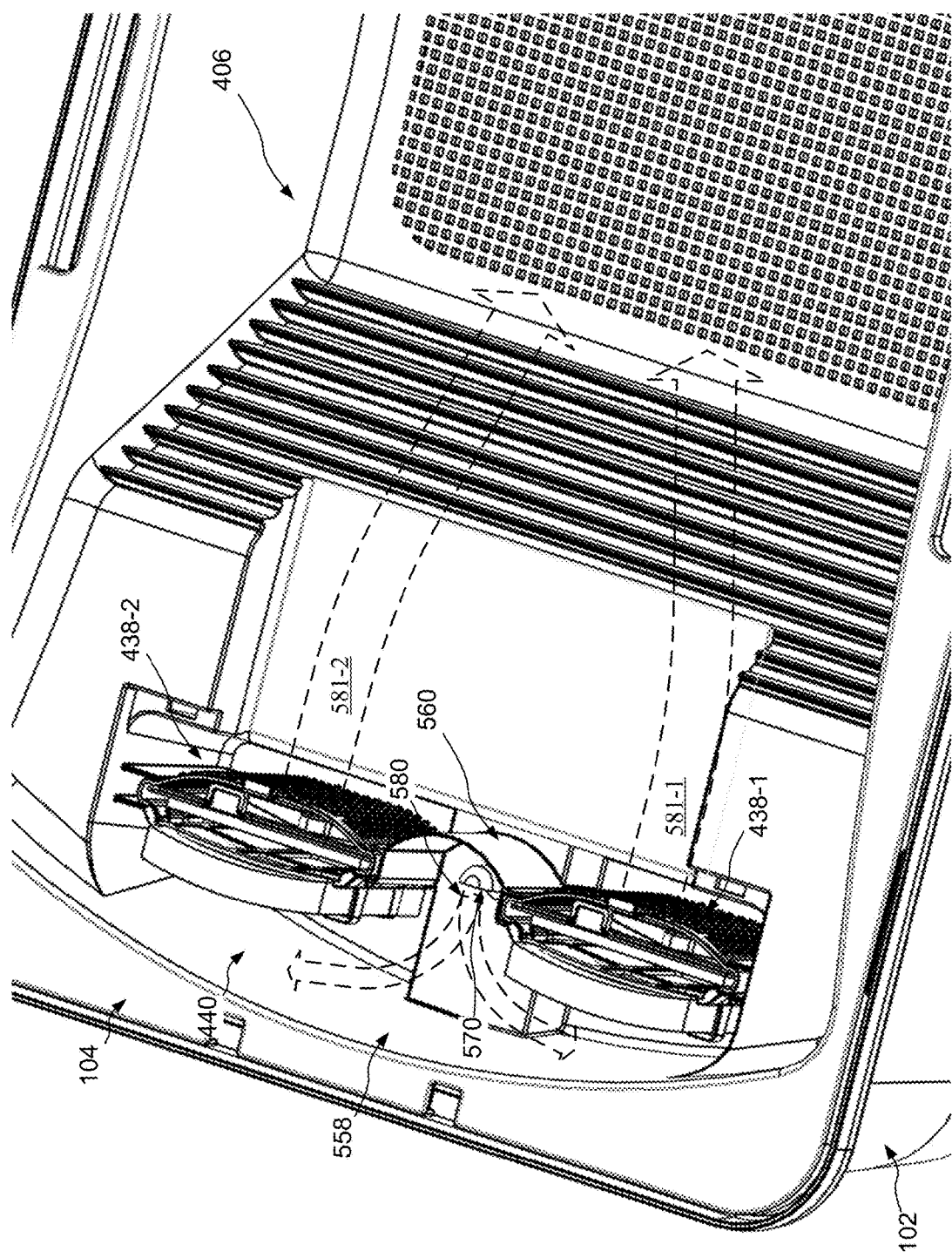
FIG. 5 shows an example perspective view of the enclosure of FIG. 1 in accordance with aspects of the present disclosure.

Turning to FIG. 5, an enlarged portion of the enclosure 100 of FIG. 1 is shown in accordance with aspects of the present disclosure. FIG. 5 shows the enclosure 100 with the filter cover 412 (See FIG. 4B) and optional cover 106 (See FIG. 1) omitted for clarity.

As shown, the first and second filter devices 438-1, 438-2 are disposed within the filter cavity 440. In particular, the first and second filter devices 438-1, 438-2 are preferably configured in a vertical orientation whereby the first and second filter devices 438-1, 438-2 extend along an axis that is substantially transverse relative to the longitudinal axis 450 of the insert 104 (see FIG. 4A). Preferably, the first and second filter devices 438-1, 438-2 include an overall height and width that prevents substantially all water (e.g., at least 80-90%, and more preferably 99-100%) from being communicated from the filter cavity 440 to the cavity 406 of the insert 104 without first passing through the associated filter media.

In the preferred example shown in FIG. 5, a partition wall 560 is preferably disposed between the first and second filter devices 438-1, 438-2 to ensure that substantially zero percent of the water exits the filter cavity 440 without having first passed through the filter media of the first and second filter devices 438-1, 438-2.

Preferably, and as shown in FIG. 5, a pump outlet 570 is disposed within the filter cavity 440. More preferably, the pump outlet 570 is disposed adjacent the partition wall 560 within the filter cavity 440. The pump outlet 570 preferably includes an aperture facing away from the cavity 406 of the insert 104 and towards sidewall surface 558 of the insert 104.

Figure 6:
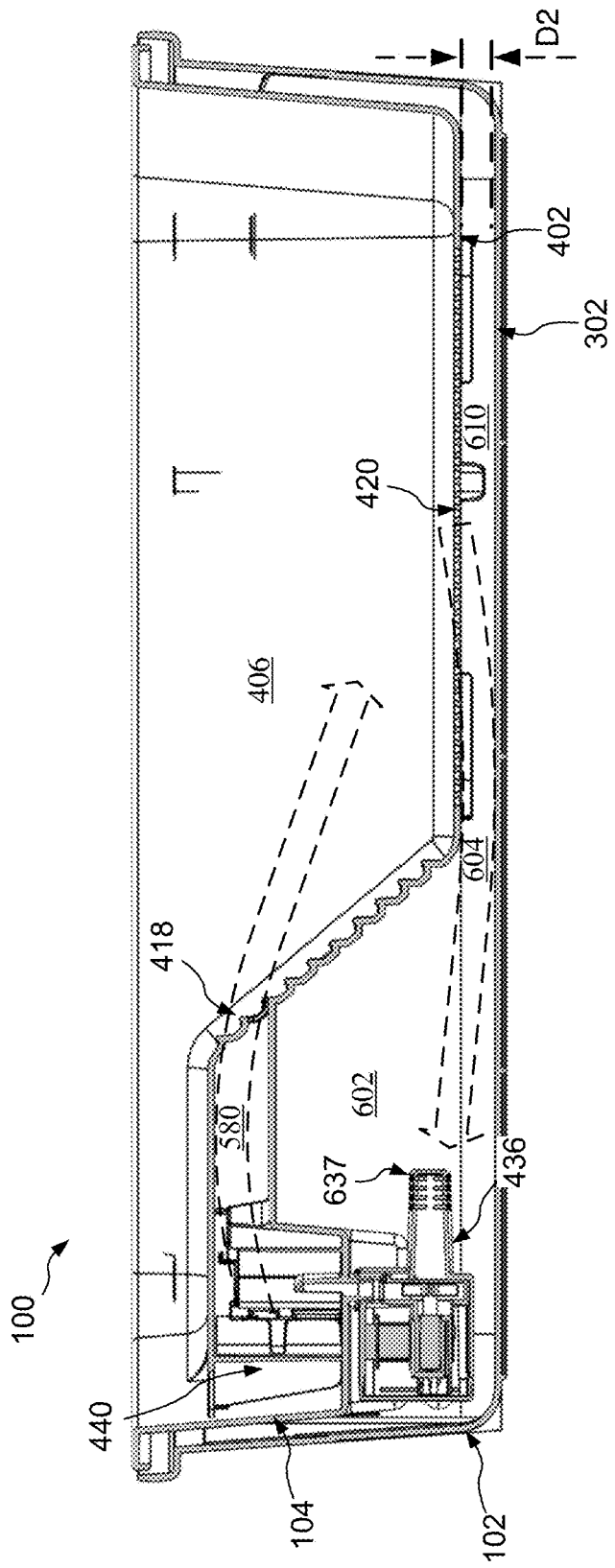
FIG. 6 shows a cross-sectional view of the enclosure of FIG. 1 taken along line 6-6, in accordance with aspects of the present disclosure.

FIG. 6 shows a cross-sectional view of the enclosure 100 taken along line 6-6 of FIG. 1. As shown, the pump 436 is preferably disposed within a pump cavity 602 collectively defined by the basin 102 and the insert 104 when coupled together. Preferably, the pump 436 is disposed within the pump cavity 602 at a distal end of the enclosure 100 relative to the cavity 406 of the insert 104. This advantageously reduces the amount of suction introduced within the cavity 406 that may be experienced by creatures swimming therein.

Preferably, the basin 102 and insert 104 collectively define a pump inlet passageway 610 (which may also be referred to herein as an inlet passageway) that extends between the base 402 of insert 104 and the base 302 of the basin 102 when coupled together. Preferably, the distance D2 (which may also be referred to herein as an offset distance) between the base 402 of the insert 104 and the base 302 of the basin 102 provides the pump inlet passageway 610 and measures at least 0.20 inches, or in the range of 0.20 to 0.50 inches. The pump inlet passageway 610 is preferably fluidly coupled to the cavity 406 by way of the one or more second openings 420 defined by the base 402 of the insert 104.

In operation, and with reference to FIGS. 5 and 6, the pump 436 generates pressure to cause water to be output via the pump outlet 570. The water output from the pump outlet 570 then flows along flow path 580. Preferably, flow path 580 diverges/splits based on the water being output against the sidewall surface 558 (See FIG. 5). In one preferred example, and as shown in FIG. 5, the flow path 580 then diverges in opposing directions along flow paths 581-1 and 581-2 such that a first portion of the water output from the pump outlet 570 flows towards and through the first filter device 438-1 and a second portion of the water output from the pump outlet 570 flows towards and through the second filter device 438-2. Preferably, this results in substantially equal amounts of water being displaced towards and through the first and second filter devices 438-1, 438-2. The filtered watered from the first and second filter devices 438-1, 438-2 then preferably gets output into the cavity 406 of the insert 104 preferably by way of the one or more first openings 418 (See FIG. 4A).

Thus, the enclosure 100 can provide filtered water preferably indirectly to the wet section 410 via flow path 580, which can dampen the force of the current generated by the pump 436 by projecting the water from the pump outlet 570 against the sidewall surface 558. Likewise, projecting filtered water in this fashion against the sidewall surface 558 also further diffuses the filtered water and directs the water through the filter cartridges.

Further during operation, the pump 436 also preferably generates negative pressure, e.g., a suction force, within the pump cavity 602. The suction force generated by the pump 436 then draws water into an inlet 637 of the pump 436 along a flow path generally shown at 604 (See FIG. 6). Thus, water within the cavity 406 of the insert 104 then gets drawn into the pump inlet passageway 610 by the generated suction along the flow path 604 by way of the one or more second openings 420 provided by the insert 104. Accordingly, water then circulates from the cavity 406 of the insert 104 through the first and second filter devices 438-1, 438-2 (See FIG. 5) by way of the flow path 604 and pump 436, and ultimately output back into the cavity 406 by way of the pump outlet 570, flow path 580, and the one or more first openings 418.

Figure 7A:
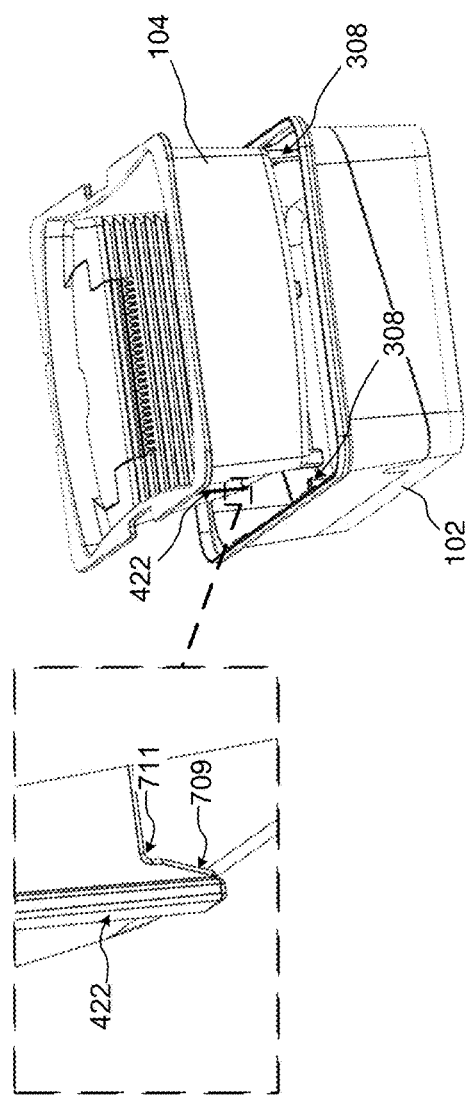
FIG. 7A shows another example perspective view of the enclosure of FIG. 1 in accordance with aspects of the present disclosure.
Figure 7B:
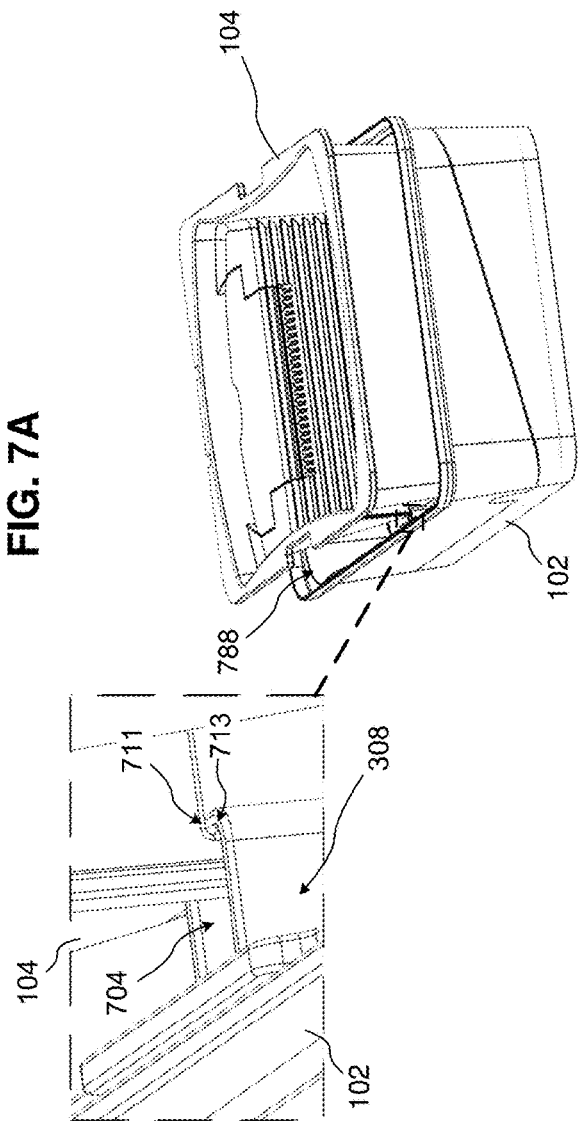
FIG. 7B shows another example perspective view of the enclosure of FIG. 1 in accordance with aspects of the present disclosure.

Turning to FIGS. 7A-7B additional aspects and features of the enclosure 100 are shown. As discussed above with regard to FIG. 3A, the basin 102 preferably includes a plurality of projections 308 within the cavity 306. In one preferred example, the plurality of projections 308 define a sleeve/opening 704 as shown in FIG. 7B.

Figure 4F:
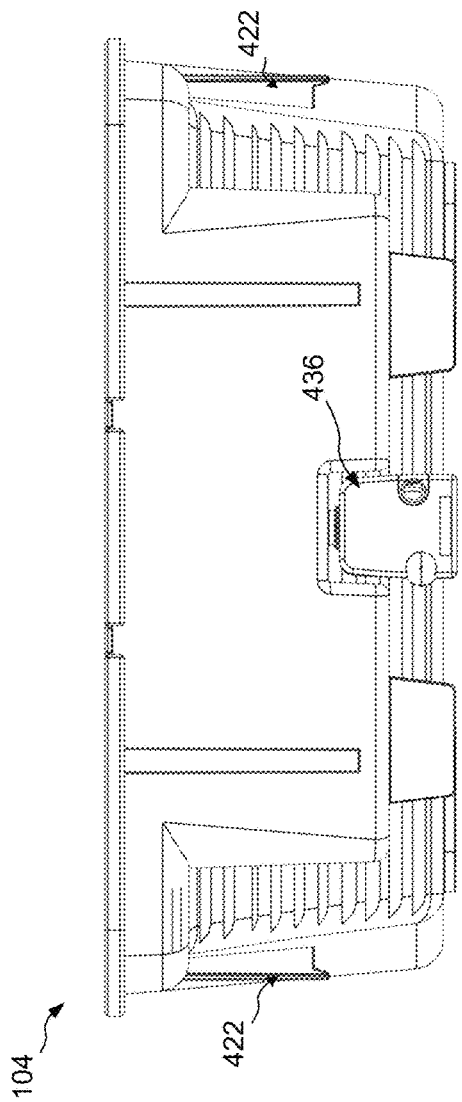
FIG. 4F shows a front view of the insert of FIG. 4A in accordance with aspects of the present disclosure.
Figure 4G:
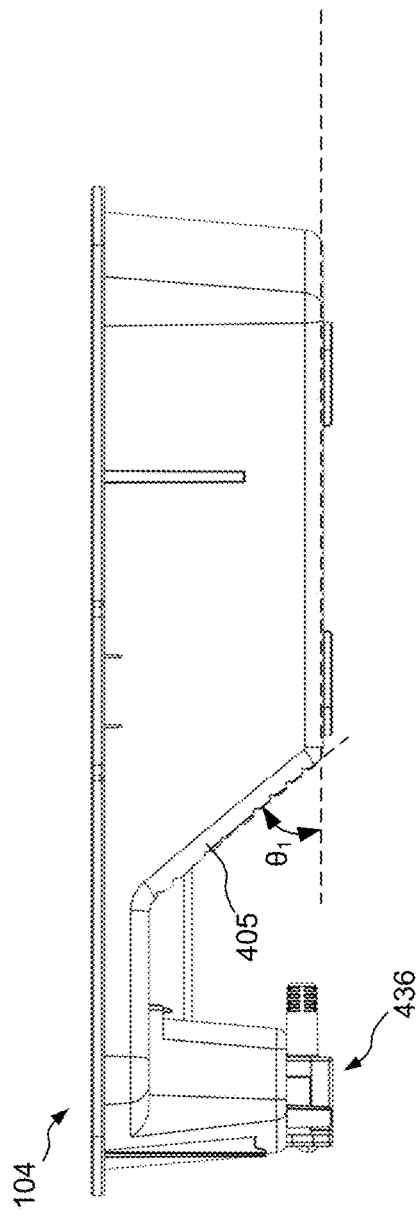
FIG. 4G shows a side view of the insert of FIG. 4A in accordance with aspects of the present disclosure.
Figure 4H:
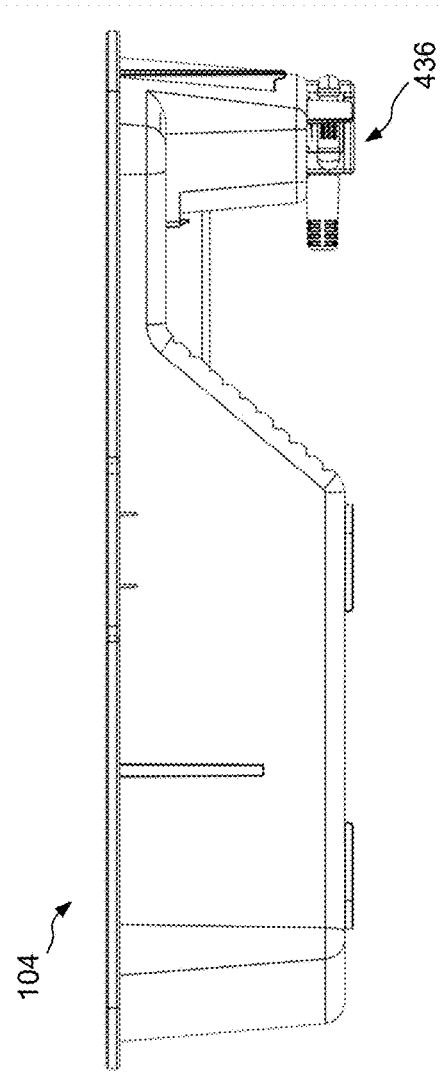
FIG. 4H shows another side view of the insert of FIG. 4H in accordance with aspects of the present disclosure.

The insert 104 also preferably includes a plurality of projections 422, which may also be referred to herein as ribs, that extend from exterior surfaces that define the plurality of sidewalls 404 (See also FIGS. 4A and 4F). The plurality of projections 422 of the insert 104 preferably include a tapered section that provides a foot 709. The plurality of projections 422 also further preferably provide an engagement surface 711 that extends substantially transverse relative to the foot 709. The foot 709 preferably includes dimensions that allow the foot 709 to be at least partially disposed within the opening 704 of a corresponding projection of the plurality of projections 308. In this preferred example, and when the foot 709 is disposed in the opening 704 of a corresponding projection of the plurality of projections 308, the engagement surface 711 may then engage a top surface 713 that defines the opening 704. Thus, the engagement surface 711 can provide a mechanical stop that prevents further insertion of the foot 709 into a corresponding projection of the plurality of projections, and thus by extension, the insert 104 from further insertion into the basin 102.

Thus, in operation, and as shown in FIG. 7B, the plurality of projections 422 of the insert 104 may then be aligned with the plurality of projections 308 of the basin 102, such that each foot 709 aligns with a corresponding hole 704 of a projection of the plurality of projections 308, and inserted to allow the insert 104 to be disposed on top of the basin 102 and held at an elevated position.

Accordingly, when cleaning is desired, a user may then "pull" the insert 104 from the basin 102 and then dispose the insert 104 on the basin 102 based on the plurality of projections 308 of the basin 102 as discussed above. The basin 102 preferably then supports the insert 104 at an elevated position above the cavity 306 of the basin 102 to allow for water within the cavity 406 of the insert 104 to drain into the cavity 306 of the basin 102 by way of gravity and the one or more second openings 420.

Once drained, the user may then remove the insert 104 from the basin 102 to perform cleaning without necessarily removing creatures from within the insert 104. Alternatively, the user may keep the insert 104 atop the basin 102 at the elevated position as described above and use the gap 788 formed therebetween to remove dirty water and/or provide clean water. The gap 788 is preferably wide enough, e.g., at least 1-2 inches wide, to allow for a tube/hose to be disposed between the insert 104 and the basin 102 to suction water from the basin for cleaning purposes. Thus, in on preferred example, the user may insert a tube or other suitable tool into the gap 788 and siphon/suction the dirty water from within the basin 102 without necessarily removing the insert 104 from the basin 102. This may be particularly advantageous when seeking to minimize the stress/disruption on creatures within the insert 104. In any such cases, the creatures may then remain in the insert 104, which is to say within the habitat provided by the insert 104, during cleaning of the basin 102. The basin 102 may then be refilled with clean water, and a user may then re-insert the insert 104 within the basin 102 in the nested configuration, e.g., as shown in FIG. 1.

Figure 8:
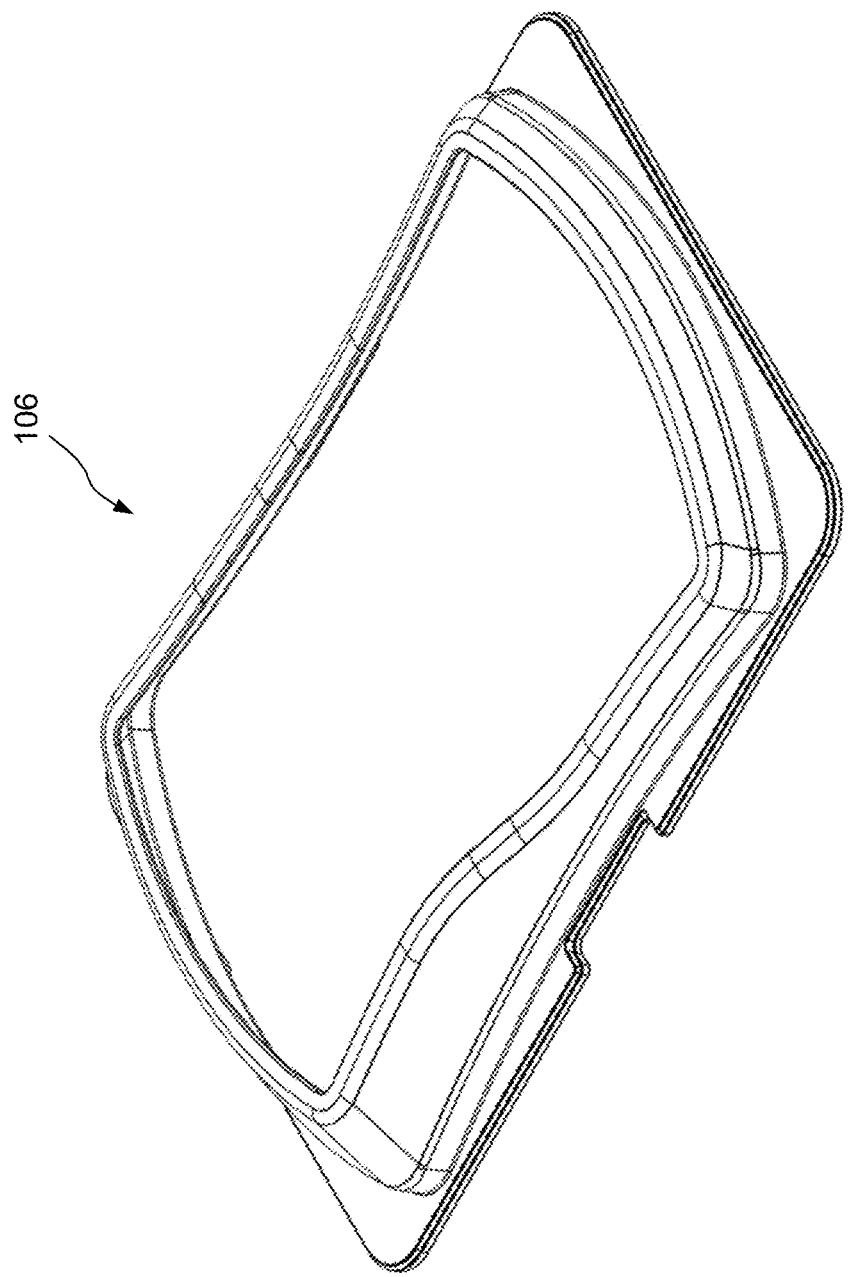
FIG. 8 shows the optional cover of the enclosure of FIG. 1 in isolation, in accordance with aspects of the present disclosure.

FIG. 8 shows an example of the optional cover 106 of the enclosure 100 of FIG. 1 in isolation, in accordance with aspects of the present disclosure. Preferably, the optional cover 106 includes a dome-like shape that prevents creatures from climbing out of the enclosure 100 but allows for air and light to enter the enclosure 100. More preferably, the optional cover 106 is formed of a substantially transparent material such as crystal styrene or polycarbonate and allows for at least 80% of incident light to pass therethrough. However, the optional cover 106 may also be formed of an opaque material.

In accordance with an aspect of the present disclosure an enclosure for providing a habitat for one or more creatures is disclosed. The enclosure comprising a basin defining a cavity to store water, an insert configured to be disposed within the cavity of the basin, the insert defining a filter section and having a profile that corresponds to a profile of the basin, and wherein the insert defines a dry section configured to be disposed above water stored within the cavity of the basin when the insert is disposed within the cavity of the basin, a wet section to be disposed within water stored within the cavity of the basin when the insert is disposed within the cavity of the basin, and a transitional section to allow for the one or more creatures to travel between the dry section and the wet section, and wherein the transitional section defines one or more first openings to communicate water from the filter section into the wet section.

In accordance with another aspect of the present disclosure an enclosure for providing a habitat for one or more creatures. The enclosure comprising a basin defining a cavity to store water, an insert configured to be disposed within the cavity of the basin, the insert having a profile that corresponds to a profile of the basin and defining a filter cavity, a filter arrangement disposed within the filter cavity of the insert, and wherein the insert includes a dry section configured to be disposed above water stored within the cavity of the basin when the insert is disposed within the cavity of the basin, a wet section to be disposed within water stored within the cavity of the basin when the insert is disposed within the cavity of the basin, and a transitional section to allow for the one or more creatures to travel between the dry section and the wet section, and wherein the transitional section defines one or more first openings to communicate water from the filter cavity into the wet section.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that an enclosure may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. An enclosure for providing a habitat for one or more creatures, the enclosure comprising:
   a basin defining a cavity to store water, wherein the basin includes a base and a plurality of sidewalls extending vertically from the base;
   an insert configured to be disposed within the cavity of the basin, the insert comprising a filter section having a filter cavity, and having a profile that corresponds to a profile of the basin;
   a removable filter cover separable from a remainder of the insert;
   wherein the insert comprises a dry section configured to be disposed above the water to be stored within the cavity of the basin when the insert is disposed within the cavity of the basin, a wet section to be disposed within the water to be stored within the cavity of the basin when the insert is disposed within the cavity of the basin, and a transitional section to allow for the one or more creatures to travel between the dry section and the wet section, and wherein the transitional section defines one or more first openings to communicate water from the filter section into the wet section;
   wherein the filter cavity is disposed beneath the dry section and is configured to receive at least one filter device to filter the water to be stored within the cavity of the basin and a pump to pump the water to be stored within the cavity of the basin to the at least one filter device, wherein the at least one filter device is disposed downstream of the pump with respect to direction of water flow through the pump and the at least one filter device;

wherein the insert, including the dry section, the wet section and the transitional section, is insertable in the cavity of the basin as to overlie the base of the basin and removable from the cavity of the basin;

wherein the insert, when assembled with the at least one filter device and the pump, are insertable into and removable from the cavity of the basin as a single unit;

wherein the base of the basin is configured such that, when the insert is disposed within the cavity of the basin, the base is planar beneath the dry section, the wet section and the transitional section of the insert overlying the base wherein a singular water volume is containable between the dry section, the wet section and the transitional section of the insert and the base;

wherein the removable filter cover covers the filter cavity and the at least one filter device;

wherein the filter cover defines at least a portion of the dry section and at least a portion of the transitional section including the one or more first openings of the transitional section; and wherein a water flow path from the at least one filter device to the one or more first openings of the transitional section is defined by both the filter cover and the remainder of the insert.

2. The enclosure of claim 1, wherein the insert includes a base and a plurality of sidewalls extending vertically from the base, and wherein the base of the insert includes a plurality of second openings to allow for communication of water therethrough into the cavity of the basin.

3. The enclosure of claim 2, wherein the plurality of sidewalls of the insert define the wet section, and wherein the plurality of sidewalls include a sloped sidewall that extends substantially transverse from the base of the insert to provide the transitional section.

4. The enclosure of claim 3, further comprising a plurality of ribs extending from the plurality of sidewalls of the insert, each of the plurality of ribs to engage and be supported by a corresponding projection of a plurality of projections defined by the basin.

5. The enclosure of claim 4, wherein the insert is configured to be disposed on top of the basin via the plurality of ribs and corresponding ones of the plurality of projections of the basin such that the base of the insert is disposed above the cavity of the basin to allow for water to drain from the wet section of the insert via gravity through the plurality of second openings into the cavity of the of the basin.

6. The enclosure of claim 5, wherein a gap is formed between the insert and the basin when the insert is disposed on top of the basin via the plurality of ribs, the gap allowing for a tube to be disposed between the insert and the basin to suction water from the basin for cleaning purposes.

7. The enclosure of claim 2, wherein the basin includes a base and a plurality of sidewalls extending vertically from the base to define the cavity, and wherein the base of the insert is disposed at a distance from the base of the basin to define a filter inlet passageway when the insert is disposed within the cavity of the basin.

8. The enclosure of claim 1, wherein the filter section of the insert is configured to receive a plurality of filter devices to filter the water to be stored within the cavity of the basin, and configured to arrange the pump between the plurality of filter devices.

9. The enclosure of claim 1, wherein the filter section of the insert is configured to support the pump above the base of the basin whereby the pump does not contact the base of the basin.

10. The enclosure of claim 1, wherein the transitional section of the insert is defined by a sloped sidewall that adjoins the dry section and the wet section, and wherein the sloped sidewall includes a plurality of grooves that extend substantially parallel with each other and substantially transverse with a longitudinal axis of the insert.

11. The enclosure of claim 1, wherein the insert defines a flange configured to engage a shoulder feature of the basin when the insert is disposed in the cavity of the basin.

12. The enclosure of claim 1, wherein the insert comprises polymeric material.

13. The enclosure of claim 1, wherein the basin comprises polymeric material.

14. An enclosure for providing a habitat for one or more creatures, the enclosure comprising:
a basin defining a cavity to store water, wherein the basin includes a base and a plurality of sidewalls extending vertically from the base;
an insert configured to be disposed within the cavity of the basin, the insert comprising a filter section having a filter cavity and having a profile that corresponds to a profile of the basin;
a removable filter cover separable from a remainder of the insert;
wherein the insert comprises a dry section configured to be disposed above the water to be stored within the cavity of the basin when the insert is disposed within the cavity of the basin, a wet section to be disposed within the water to be stored within the cavity of the basin when the insert is disposed within the cavity of the basin, and a transitional section to allow for the one or more creatures to travel between the dry section and the wet section, and wherein the transitional section defines one or more first openings to communicate water from the filter section into the wet section;
wherein the filter cavity is disposed beneath the dry section and comprises at least one filter device to filter the water to be stored within the cavity of the basin and a pump to pump the water to be stored within the cavity of the basin to the at least one filter device, wherein the at least one filter device is disposed downstream of the pump with respect to direction of water flow through the pump and the at least one filter device;
wherein the insert, including the dry section, the wet section and the transitional section, is insertable in the cavity of the basin as to overlie the base of the basin and removable from the cavity of the basin;
wherein the insert, including the at least one filter device and the pump, are insertable into and removable from the cavity of the basin as a single unit;
wherein the base of the basin is configured such that, when the insert is disposed within the cavity of the basin, the base is planar beneath the dry section, the wet section and the transitional section of the insert overlying the base wherein a singular water volume is containable between the dry section, the wet section and the transitional section of the insert and the base;
wherein the removable filter cover covers the filter cavity and the at least one filter device;

wherein the filter cover defines at least a portion of the dry section and at least a portion of the transitional section including the one or more first openings of the transitional section; and wherein a water flow path from the at least one filter device to the one or more first openings of the transitional section is defined by both the filter cover and the remainder of the insert.

15. The enclosure of claim 1, wherein the insert includes a base and a plurality of sidewalls extending vertically from the base, and wherein the base defines one or more second openings to communicate water from the wet section to the cavity of the basin.

16. The enclosure of claim 15, wherein the one or more first openings define a filter outlet to communicate water from the filter section to the wet section, and the one or more second openings define a filter inlet to communicate water from the wet section into the filter section.

\* \* \* \* \*